US009467396B2

(12) United States Patent
Chrysos et al.

(10) Patent No.: US 9,467,396 B2
(45) Date of Patent: Oct. 11, 2016

(54) SIMULTANEOUS TRANSFERS FROM A SINGLE INPUT LINK TO MULTIPLE OUTPUT LINKS WITH A TIMESLICED CROSSBAR

(71) Applicant: International Business Machines Corporation, Armonk, NY (US)

(72) Inventors: Nikolaos Chrysos, Thalwil (CH); Girish Gopala Kurup, Bangalore (IN); Cyriel J. Minkenberg, Gutenswil (CH); Anil Pothireddy, Bangalore (IN); Vibhor K. Srivastava, Bangalore (IN); Brian T. Vanderpool, Byron, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 41 days.

(21) Appl. No.: 14/250,702

(22) Filed: Apr. 11, 2014

(65) Prior Publication Data

US 2015/0295858 A1 Oct. 15, 2015

(51) Int. Cl.
*H04L 12/933* (2013.01)
*H04L 12/937* (2013.01)
*H04L 12/861* (2013.01)

(52) U.S. Cl.
CPC ......... *H04L 49/101* (2013.01); *H04L 49/1523* (2013.01); *H04L 49/254* (2013.01); *H04L 49/90* (2013.01)

(58) Field of Classification Search
None
See application file for complete search history.

(56) References Cited

U.S. PATENT DOCUMENTS

| 5,280,623 | A | 1/1994 | Sodos et al. |
| 5,299,190 | A | 3/1994 | LaMaire et al. |
| 5,483,521 | A | 1/1996 | Aramaki |
| 5,572,682 | A | 11/1996 | Garibay, Jr. et al. |
| 5,689,644 | A | 11/1997 | Chou et al. |
| 6,052,368 | A | 4/2000 | Aybay |
| 6,208,667 | B1 | 3/2001 | Caldara et al. |
| 6,215,788 | B1 | 4/2001 | Sakurai et al. |
| 6,314,106 | B1 | 11/2001 | King et al. |
| 6,633,580 | B1 | 10/2003 | Torudbakken et al. |
| 6,735,203 | B1 | 5/2004 | Heiman |
| 6,763,418 | B1 | 7/2004 | Chou et al. |
| 6,804,743 | B2 | 10/2004 | Manning |
| 6,888,841 | B1 | 5/2005 | Ozaki |
| 6,954,811 | B2 | 10/2005 | Vishnu |
| 7,143,185 | B1 * | 11/2006 | Yang ...................... H04L 49/00 709/213 |

(Continued)

OTHER PUBLICATIONS

Hsin-Chou Chi, "Crossbar Arbitration in Interconnection Networks for Multiprocessors and Multicomputers," UCLA, 1994, 213 pages.

(Continued)

*Primary Examiner* — Chi H Pham
*Assistant Examiner* — Soon-Dong D Hyun
(74) *Attorney, Agent, or Firm* — Patterson + Sheridan, LLP

(57) ABSTRACT

A method for scheduling a crossbar using distributed request-grant-accept arbitration between input group arbiters and output group arbiters in a switch unit is provided. The switch unit may be a hierarchical high radix switch with a timesliced crossbar that is configured to transfer packets between a plurality of input ports and a plurality of output ports, organized into groups, using wide words. The timesliced crossbar transfers data for a given packet once per supercycle, in a designated timeslice of that supercycle. Multiple buffered packets from one input port to multiple output ports are transferred by utilizing different timeslices of the supercycle.

12 Claims, 10 Drawing Sheets

(56) References Cited

U.S. PATENT DOCUMENTS

| | | |
|---|---|---|
| 7,158,512 B1 | 1/2007 | Kamhine |
| 7,173,906 B2 | 2/2007 | Ravi et al. |
| 7,292,594 B2 | 11/2007 | Meempat et al. |
| 7,426,216 B2 | 9/2008 | Yang et al. |
| 7,492,782 B2 | 2/2009 | Jun et al. |
| 7,539,199 B2 | 5/2009 | Shrimali et al. |
| 7,609,695 B2 | 10/2009 | Zhu et al. |
| 7,643,493 B1 | 1/2010 | Sayrafian-Pour |
| 7,778,254 B2 | 8/2010 | Kadambi et al. |
| 7,826,468 B2 | 11/2010 | Shimizu et al. |
| 7,830,902 B2 | 11/2010 | Ichimiya et al. |
| 7,848,341 B2 | 12/2010 | Benner et al. |
| 8,001,335 B2 | 8/2011 | Chen et al. |
| 8,059,671 B2 | 11/2011 | Naven et al. |
| 8,135,024 B2 | 3/2012 | Abel et al. |
| 8,352,669 B2 | 1/2013 | Wu et al. |
| 8,467,294 B2 | 6/2013 | Raman et al. |
| 8,902,899 B2 | 12/2014 | Chrysos et al. |
| 8,984,206 B2 | 3/2015 | Chrysos et al. |
| 2001/0021191 A1* | 9/2001 | Isoyama ............ H04Q 11/0478 370/392 |
| 2001/0050916 A1 | 12/2001 | Krishna et al. |
| 2001/0053157 A1 | 12/2001 | Li |
| 2002/0048280 A1* | 4/2002 | Lee .................. H04L 47/10 370/468 |
| 2002/0176431 A1* | 11/2002 | Golla .................. H04L 49/254 370/412 |
| 2003/0072326 A1* | 4/2003 | Alasti ................. H04L 12/5693 370/462 |
| 2003/0191879 A1 | 10/2003 | Marmash |
| 2004/0083326 A1 | 4/2004 | Wang et al. |
| 2004/0085964 A1* | 5/2004 | Vaananen .......... H04L 12/5693 370/395.4 |
| 2004/0120337 A1* | 6/2004 | Jun .................... H04L 47/6225 370/413 |
| 2005/0117575 A1 | 6/2005 | Konda |
| 2005/0135398 A1* | 6/2005 | Muthukrishnan ... H04L 12/5693 370/428 |
| 2008/0253289 A1 | 10/2008 | Naven et al. |
| 2010/0053157 A1 | 3/2010 | Harkin |
| 2010/0272117 A1 | 10/2010 | Wu et al. |
| 2011/0311011 A1* | 12/2011 | Zhang ................. H04J 3/0632 375/371 |
| 2012/0233349 A1 | 9/2012 | Aybay |
| 2014/0063316 A1 | 3/2014 | Lee et al. |
| 2014/0122771 A1 | 5/2014 | Chrysos et al. |

OTHER PUBLICATIONS

U.S. Appl. No. 14/012,055 entitled "Implementing Hierarchical High Radix Switch with Timesliced Crossbar," filed Aug. 28, 2013 by Nikolaos Chrysos et al.

Kim et al., "Microarchitecture of a High-Radix Router", ACM SIGARCH Computer Architecture News—ISCA 2005 Homepage vol. 33 Issue 2, May 2005, pp. 420-431.

Ahn et al., "HyperX: Topology, Routing, and Packaging of Efficient Large-Scale Networks", Proceedings of the Conference on High Performance Computing Networking, Storage and Analysis Article No. 4, Nov. 2009.

Jun et al., "A Two-Dimensional Scalable Crossbar Matrix Switch Architecture", Communications, 2003. ICC '03. IEEE International Conference on vol. 3, May 11-15, 2003.

Kar, K. et al., "Reduced Complexity Input Buffered Switches", http://citeseerx.ist.psu.edu.viewdoc/summary?doi=10.1.137.7524 . . . ; Hot Interconnect 2000; Jul. 16, 2011.

Chrysos, N. et al., "Scheduling in switches with samll internal buffers", GLOBECOM'05; IEEE Global Telecommunications Conference (IEEE Cat. No. 05CH37720); 6PP; ieee.; 2006.

Hluchy J et al., "Queueing in High-Performance Packet Switching," IEEE Journal on Selected Areas in Communications, vol. 6, No. 9, Dec. 1988.

McKeown, "The iSLIP Scheduling Algorith for Input-Queued Switches,"IEEE/ACM Transactions on Networking, vol. 7, No. 2, Apr. 1999.

Bubenik et al., "Performance of a Broadcast Packet Switch," IEEE Transaction Communications, vol. 37, No. 1, Jan. 1989.

Park et al., "NN Based ATM Cell Scheduling with Queue Length-based Priority Scheme,: IEEE Journal on Selected Area in Communications." vol. 15 No. 2 Feb. 1997.

Karol et al., "Input Versus Output Queueing on a Space-Division Packet Switch," IEEE Transactions on Communicaitons, vol. COM-35, No. 12, Dec. 1987.

Serpanos et al., "Firm: A Class of Distributed Scheduling Algorithms for High-Speed ATM Switches with Multiple Input Queues," IEEE INFOCOM 2000.

* cited by examiner

SIMULTANEOUS TRANSFERS FROM A SINGLE INPUT LINK TO MULTIPLE OUTPUT LINKS WITH A TIMESLICED CROSSBAR

BACKGROUND

Embodiments of the present disclosure generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

BRIEF SUMMARY

Embodiments of the present disclosure provide a computer-implemented method for scheduling a crossbar using distributed request-grant-accept arbitration between input group arbiters and output group arbiters in a switch unit. The method includes selecting a first input port of an input group according to a first arbitration operation. The input group includes a plurality of input ports including the first input port having buffered packets targeting a plurality of output ports. The method further includes transferring, by operation of a crossbar, a first packet of the buffered packets from the first input port during a first timeslice of a cycle. The cycle includes a plurality of timeslices. The method includes selecting the first input port according to a second arbitration operation, and transferring, by operation of the crossbar, a second packet of the buffered packets from the same first input port during a second timeslice of the cycle.

Embodiments of the present disclosure further provide a computer program product computer program product for scheduling a crossbar using distributed request-grant-accept arbitration between input group arbiters and output group arbiters in a switch unit. The computer program product includes a computer-readable storage medium having computer-readable program code embodied therewith. The computer-readable program code includes computer-readable program code configured to select a first input port of an input group according to a first arbitration operation, wherein the input group comprises a plurality of input ports including the first input port having buffered packets targeting a plurality of output ports. The computer-readable program code includes computer-readable program code configured to, transfer, by operation of a crossbar, a first packet of the buffered packets from the first input port during a first timeslice of a cycle, wherein the cycle comprises a plurality of timeslices. The computer-readable program code includes computer-readable program code configured to select the first input port according to a second arbitration operation, and computer-readable program code configured to, transfer, by operation of the crossbar, a second packet of the buffered packets from the same first input port during a second timeslice of the cycle.

Embodiments of the present disclosure further provide an apparatus having a plurality of input ports including a first input port organized into input groups, a plurality of output ports organized into output groups, and a crossbar configured to selectively connect the plurality of input ports to the plurality of output ports. The apparatus further includes a computer processor, and a memory storing firmware, which, when executed on the computer processor, performs an operation. The operation includes selecting the first input port of an input group according to a first arbitration operation, the first input port having buffered packets targeting at least one of the plurality of output ports. The operation further includes, transferring, by operation of the crossbar, a first packet of the buffered packets from the first input port during a first timeslice of a cycle. The cycle includes a plurality of timeslices. The operation includes selecting the first input port according to a second arbitration operation, and transferring, by operation of the crossbar, a second packet of the buffered packets from the same first input port during a second timeslice of the cycle.

BRIEF DESCRIPTION OF THE SEVERAL VIEWS OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this present disclosure and are therefore not to be considered limiting of its scope, for the present disclosure may admit to other equally effective embodiments.

Figure 1:
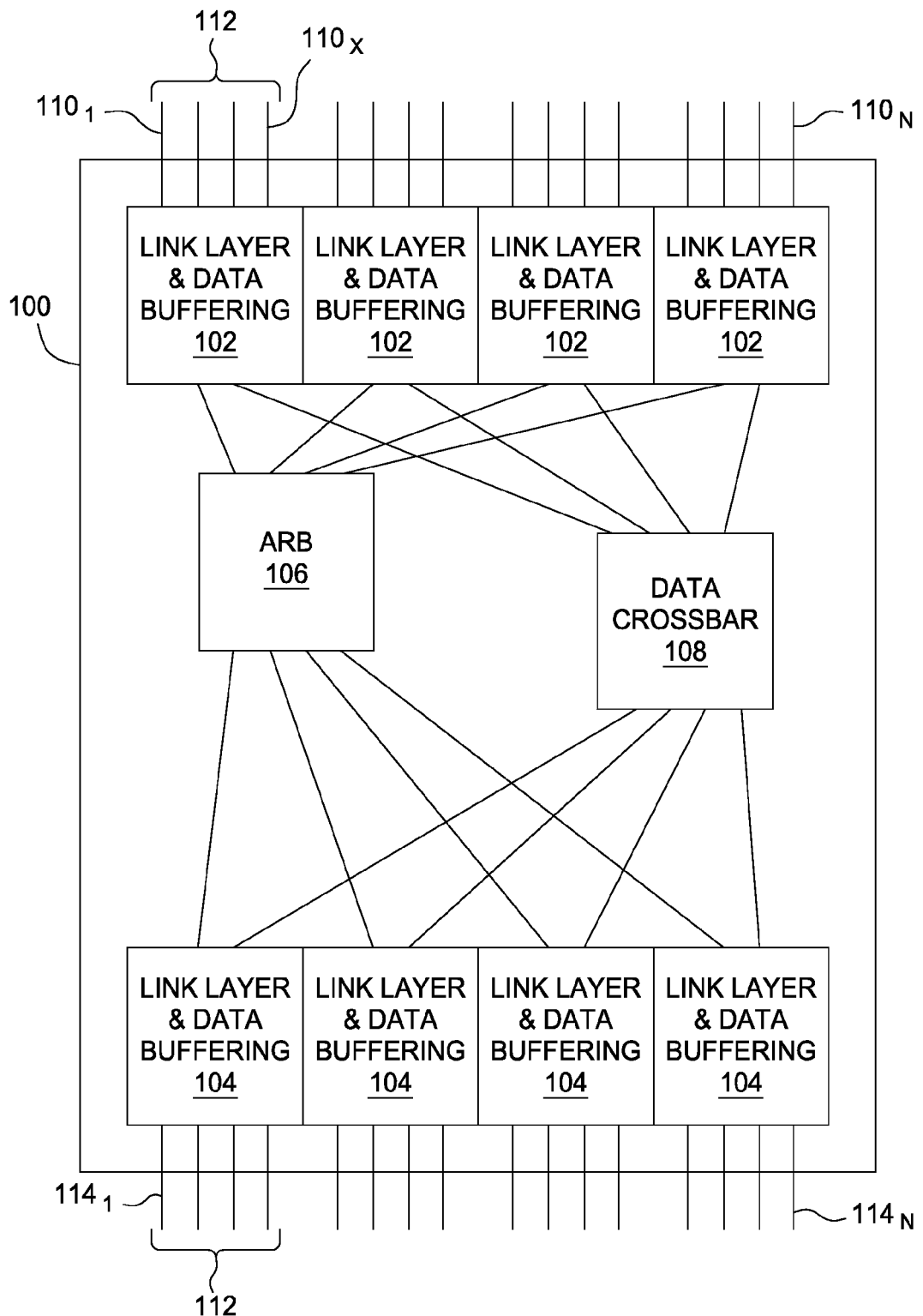
FIG. 1 is a block diagram depicting a switch unit configured to implement hierarchical high radix switching using a time-sliced crossbar, according to embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments disclosed herein provide techniques to implement an efficient scheduling scheme for a crossbar scheduler that provides distributed request-grant-accept arbitration between input arbiters and output arbiters in a distributed switch. Crossbars are components serving as basic building blocks for on-chip interconnects and large, off-chip switching fabrics, such as those found in data centers. High-radix crossbars, i.e. crossbars with many ports, are often desired, as they allow creating large networks with fewer silicon chips and thus for a lower cost. Despite technology scaling, crossbar port scaling may be restricted by the quadratic cost of crossbars, as well as by the targeted port speed, which also increases from one silicon generation to the next. Even where routing a large number of wires in a small area of silicon seems feasible on paper, placement-and-routing tools may often find it difficult to achieve efficient routing of such a large number of wires.

The same may hold true for crossbar schedulers, which should preferably also scale together with the crossbar data-path. Crossbar schedulers may often be based on a distributed request-grant arbitration, between input and output arbiters. Flat schedulers, having one arbiter for each input and output port, may often achieve the best delay-throughput and fairness performance.

However, routing wires between N input and N output arbiters may require a full-mesh interconnect, with quadratic cost, which may become expensive for crossbars with more than 64 ports. To overcome this cost, hierarchical scheduling solutions may be used. To that end, inputs may be organized in groups—for example, quads—and arbitration is performed at the quad level rather than at an individual input level. An input arbiter may also be referred to herein as an input group arbiter, and an output arbiter may also be referred to herein as an output group arbiter.

Although quad-based scheduling reduces the number of wires that are to be routed within the chip area dedicated to the crossbar scheduler, quad-based scheduling may compromise bandwidth in at least some instances. Specifically, the problem arises of how to maintain the total crossbar bandwidth when the number of crossbar ports is reduced. In some crossbars where each input and output link has a dedicated port, it may not be possible for an input link to have more than one packet being transferred at any given time, unless interleaving is supported. In the absence of interleaving, there is no additional switch port bandwidth with which to transfer another packet. Furthermore, in quad-based scheduling architectures, packet transfers are performed with wide words, but only once every supercycle, where a supercycle may consist of multiple cycles (e.g., 4 cycles). This may result in idle cycles (e.g., 3 idle cycles) and a less effectively used crossbar bandwidth.

Accordingly, one embodiment provides an operation to implement a scheduling scheme for a crossbar scheduler that provides distributed request-grant-accept arbitration between input group arbiters and output group arbiters in a distributed switch. One embodiment is directed to a distributed switching device having a plurality of input and output ports. The input ports and output ports may be grouped into respective quads, e.g., four ports are grouped together and managed by a respective arbiter. An input port may request an output port when the input port has a packet for that output port in data queues of the input port. The port requests are consolidated by the input groups and sent as consolidated requests to each output, e.g., by operation of a bitwise OR operation on the respective port requests from the local input ports in that input group. Each output group grants one of the requesting input groups using a rotating priority defined by a predefined pointer, such as a next-to-serve pointer.

With a timesliced crossbar and supercycle-based timing scheme, embodiments of the present disclosure are able to transfer multiple buffered packets from one input links to multiple output links by utilizing different subcycles of the supercycle, rather than having a restriction of only allowing one active packet transfer from an input link to an output link. By allowing multiple simultaneous packet transfers per input link, the input links are able to effectively use the full crossbar bandwidth to rapidly transmit any buffered packets. As such, disclosed embodiments provide a scheduling scheme for quad-based arbitration in a crossbar scheduler that the high bandwidth throughput of a flat scheduler.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the following, reference is made to embodiments of the present disclosure. However, it should be understood that the disclosure is not limited to specific described embodiments. Instead, any combination of the following features and elements, whether related to different embodiments or not, is contemplated to implement and practice aspects of the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

FIG. 1 is a block diagram depicting a switch unit 100 configured to implement hierarchical high radix switching using a time-sliced crossbar, according to embodiments of the present disclosure. The switch unit 100 may include a plurality of input ports 110, a plurality of output ports 114, a plurality of link layer and data buffering logic blocks 102 and 104, an arbitration element 106, and a data crossbar 108. While the input ports 110 and output ports 114 (as well as logic blocks 102, 104) are depicted as separate, it is noted that they logically represent different passes through the same ports and logic blocks, before and after being routed through the data crossbar 108 of the switch unit 100.

In one embodiment, the plurality of ports 110, 114 are configured to transmit and receive data packets to and from the switch unit 100 via links connected to the ports 110. The ports 110, 114 may be grouped together to form groups 112 of ports, and scheduling packet transfers between ports (i.e., arbitration) is performed at the group level. A switch port within a group 112 may be sometimes referred to as a subport. In the embodiment shown, the switch unit 100 includes N input ports (e.g., $110_1$ to $110_N$) and N output ports (e.g., $114_1$ to $114_N$) grouped in Y groups of X ports (e.g., $110_1$ to $110_X$), such that X*Y=N, although other configurations and arrangements of port groupings may be used, including groups having different numbers of subports. For clarity of illustration, the following disclosure describe one exemplary switch unit 100 configured as a 136×136 port switch, where 4 ports are grouped together to form a group, referred to interchangeably as a quad, resulting in 34 quads (i.e., N=136, X=4, Y=34).

As shown in FIG. 1, each group 112 of ports may have a corresponding logic block 102, 104 that handles the data buffering and link layer protocol for that group of subports. In one embodiment, a link layer portion of logic blocks 102 is configured to manage the link protocol operations of the switch unit 100, which may include credits, error checking, and packet transmission. In one embodiment, a data buffering portion of logic block 102 is configured to receive incoming packet "flits" (flow control digits) and buffers these flits in a data array. In one example, data buffering portion of logic block 102 may receive incoming packet flits, up to two flits per cycle, and buffers the flits in an 8-flit wide array. The data buffering portion of logic blocks 102 may be further configured to handle sequencing of an arbitration-winning packet out to the data crossbar 108, as well as receiving incoming crossbar data to sequence to an output link.

The arbitration element 106 may include a plurality of input arbiters and a plurality of output arbiters that coordinate to perform an arbitration operation based on a request/grant/accept protocol, as described in greater detail below. In one embodiment, the arbitration element 106 may include at least one input arbiter and at least one output arbiter associated with each group 112. For example, the arbitration element 106 may include 34 input arbiters and 34 output arbiters (e.g., Y=34). An input arbiter associated with a particular group 112 may be configured to queue incoming packet destination information and manage active transfers from that input group. An output arbiter may be configured to track outgoing subport availability and provide fairness in scheduling through the use of a per-subport "next-to-serve" pointer.

In operation, the destinations of incoming packets received by an input group 112 are unified together (e.g., via a logical OR operation) such that the particular group makes a single packet transfer request to the arbitration element 106, rather than multiple requests for the individual subports. The arbitration element 106 looks at all the requests from all groups 112, looks at the availability of the output ports, and determines which group 112 gets to start a packet transfer, sometimes referred to as "winning" arbitration. When a particular packet wins arbitration, the arbitration element 106 signals to an input data buffer (e.g., within logic block 102) to start a packet transfer, signals the data crossbar 108 to route the data to the correct output data buffer, and signals to the output data buffer to expect an incoming packet.

The data crossbar 108 connects multiple (group) inputs to multiple (group) outputs for transferring data packets. In one embodiment, the data crossbar 108 may have a "low" number of inputs and outputs relative to the number of ports 110, and may have a "wide" data width relative to an incoming data rate of the switch unit 100, i.e., a higher data rate relative to the data rate of the subports 110. For example, the data crossbar 108 may be a wide low port 34×34 crossbar having a 40 byte data width (i.e., 34×34@40B), which reduces the number of internal wires by a factor of 16 compared to a conventional flat 136× 136@10B crossbar. The data crossbar 108 may provide an internal speed up relative to the incoming link data rate, for example, in one implementation; the internal speedup may be a factor of 1.45.

Figure 2:
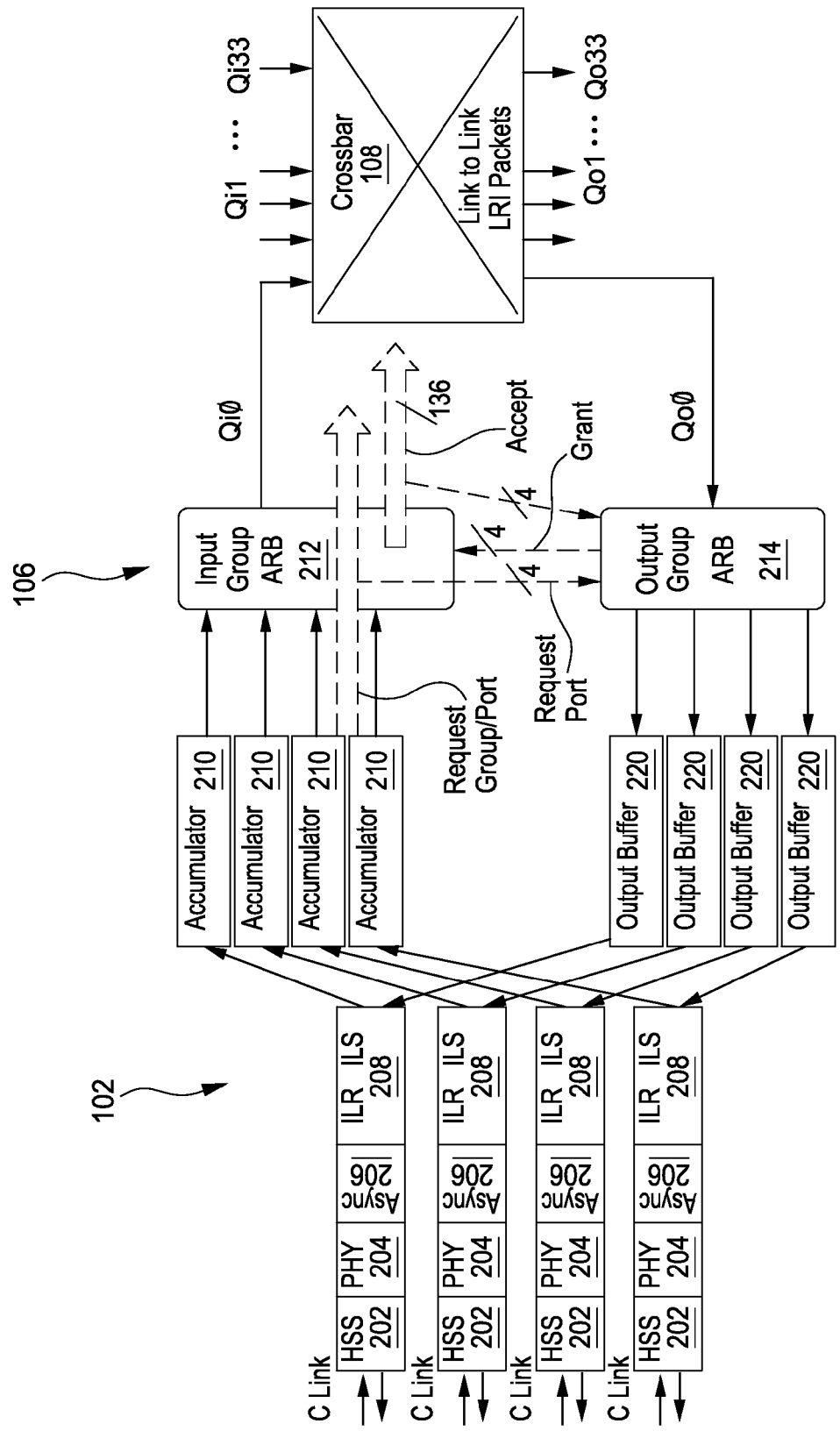
FIG. 2 is a block diagram depicting the switch unit of FIG. 1 in greater detail, according to embodiments of the present disclosure.

FIG. 2 is a block diagram depicting the switch unit 100 in greater detail, according to embodiments of the present disclosure. Each link layer and data buffering logic block 102 may include one or more high-speed serial (HSS) interfaces 202, physical layer interfaces 204, asynchronous blocks 206, integrated link protocol blocks 208 having integrated link send (ILS) and an integrated link receive (ILS) blocks, accumulators 210, and output buffers 220. While FIG. 2 depicts a link layer and data buffering logic block 102 for a particular quad (e.g., Quad0), it should be noted that the other link layer and data buffering logic blocks may be configured similarly.

In operation, packet data arriving off a link, depicted as a chassis link (CLink), at the HSS interface 202 at an incoming link data rate (e.g., 10 B/cycle) is checked by the integrated link protocol block 208. As packets arrive on the link from the ILR 208, the packet data is forwarded to the accumulator 210 which acts as an input buffer that accumulates and buffers the packets. Depending on how busy output links of the data crossbar to which the buffered packets are to be sent to, the accumulator 210 may not win the arbitration process, and packets may start to accumulate in this input buffer. In some embodiments, the accumulator 210 may have a predefined packet depth, for example, is able to store up to 16 incoming packets (i.e., has a packet depth of 16). The accumulator 210 may buffer packets in the wide data width of the data crossbar 108, which is greater than the incoming link data rate. In some embodiments, the wide data width of the data crossbar may be predefined as a multiple, or other factor, of the incoming link data rate. For example, packets may arrive at 10 B/cycle, and the accumulator 210 may buffered packets in a wide data width of 40 B/cycle, i.e., the incoming data rate is one-fourth the bandwidth between the accumulator 210 and the data crossbar 108.

In one or more embodiments, the switch unit 100 may use an internal clock cycle for coordinating transfer of packets between ports of the switch unit. The internal clock cycle are conceptually organized in divisions of time, referred to herein as "timeslices" or cycle indexes. In some embodiments, the number of divisions of time may be determined based on the relationship between the wide data width of the data crossbar and the incoming link data rate, e.g., the number of timeslices in a supercycle may be based on the ratio of the data width of the crossbar to the incoming data rate of the input ports.

In one implementation, each clock cycle may be organized into groups of four, yielding four timeslices, e.g., as "timeslice 0", "timeslice 1", "timeslice 2", and "timeslice 3", or designated by cycle indexes 0, 1, 2, and 3. In other words, if enumerated, the present clock cycle (e.g., "cc") mod 4 gives the index of the current timeslice. A cycle of all timeslices may be referred to as a "supercycle". A supercycle may begin with the start of each clock cycle "cc0" (i.e., cc0 mod 4=0), and ends with clock cycle "cc3" (i.e., cc3 mod 4=3).

The transfer of a packet from an input to an output occurs in steps, during consecutive timeslices of the same clock index. In order to transport a packet, p, a timeslice at clock index 0 must be allocated at which the corresponding crossbar input and output ports are idle, via the arbitration process. These crossbar ports become booked for all clock index 0 timeslices while the packet is being transferred; the remaining timeslices are however free, and may be assigned to transfer other packets from the same crossbar input (i.e., input quad), or to the same crossbar output (i.e., output quad) in parallel with the transfer of p. The crossbar ports of packet p may be able to allocate their clock index 0 timeslice to any other packet after the ports have finished transferring the packet p.

According to one embodiment, the remaining idle timeslices may also be assigned to transfer other packets from the same input link while the packet p is being transferred. It is noted that other crossbars may have crossbar inputs dedicated to single links, and may not have more than one packet being transferred simultaneously. In such crossbars, a packet is removed at the head of a queue and sent through the crossbar, and do not have any extra bandwidth to take a next queued packet. In some instances, the restriction of a packet transfer from a single input link from dedicated crossbars has been maintained, even in systems with quad-based crossbar scheduling. Accordingly, embodiments of the present disclosure provide a system architecture having a bandwidth between a particular accumulator 210 and the data crossbar 108 that is greater than (e.g., 4×) the incoming link bandwidth, which takes utilizes the extra bandwidth to send multiple packets queued up in a particular accumulator 210 for a same input link across different timeslices in the same supercycle.

As shown in FIG. 2, the arbitration element 106 includes an input group arbiter 212 and an output group arbiter 214 for that quad is coupled between the accumulator 210 and the data crossbar 108. In one embodiment, the data crossbar 108 connects multiple input groups, identified as Qi0 to Qi33, to multiple output groups, identified Qo0 to Qo33, for transferring data packets. Each input group (e.g., Qi0) may be associated with a corresponding input group arbiter 212, and each output group (e.g., Qo0) may be associated with a corresponding output group arbiter 214. Once a packet wins arbitration (e.g., by operation of the input group arbiter 212), the data is passed through the data crossbar 108 at the wide data width (e.g., 40B/cycle) at least once per supercycle, and then is converted back to the link data rate (e.g., 10B/cycle) by the output buffers 220 over a plurality of clock cycles (e.g., 4 cycles). In one embodiment, the output data buffer 220 serializes the full wide data width of data (e.g., 40B of data) received from the data crossbar 108 into a maximum data width of the incoming link data rate over all cycles of a supercycle (e.g., 10B over the 4-cycle supercycle). The packet may then be passed to the output ILS 208 for transmission out of the switch unit 100.

Each incoming packet may be assigned a buffer location at the start of the packet. The buffer location and an output destination link are communicated to the arbitration element 106 at the start of the packet. The data buffering logic block 102 may also communicate to the arbitration element 106 when the packet has been fully received (i.e., the tail). In this manner, the arbitration element 106 may decide to allow the packet to participate in arbitration as soon as any valid header flits have arrived (i.e., a cut-through) or only after the packet has been fully buffered in the accumulator 210 (i.e., a store-and-forward).

As mentioned above, when a packet wins arbitration in the arbitration element 106, the arbitration element 106 signals the input data buffer to start transferring that packet with a start signal and a specified buffer location associated with the packet. In response to the start signal and buffer location from the arbitration element 106, the accumulator 210 reads the buffered flits from the array, and passes the flits to the crossbar. In one embodiment, the clock cycle on which the start signal arrives determines which cycle index (i.e., timeslice) of the supercycle is utilized for the packet's data transfer. The designated cycle index may be occupied at both the accumulator 210 and the output data buffers 220, until the accumulator 210 signals the final packet flits have been transmitted. It should be noted that the same cycle index can be simultaneously utilized by outer input/output pairs.

In the case that the incoming packet has been fully received before the packet has won arbitration, each transfer through the crossbar (recall: one transfer per supercycle) may contain a full wide data width of data (e.g., 40B) until the final transfer. In the case that the packet is still arriving when the packet wins arbitration, the transfer through the data crossbar 108 may occur at the full wide data width (e.g., 40B/cycle) for any buffered data, and when the buffered data is exhausted, the remaining data is transferred at the incoming link data rate.

Figure 3:
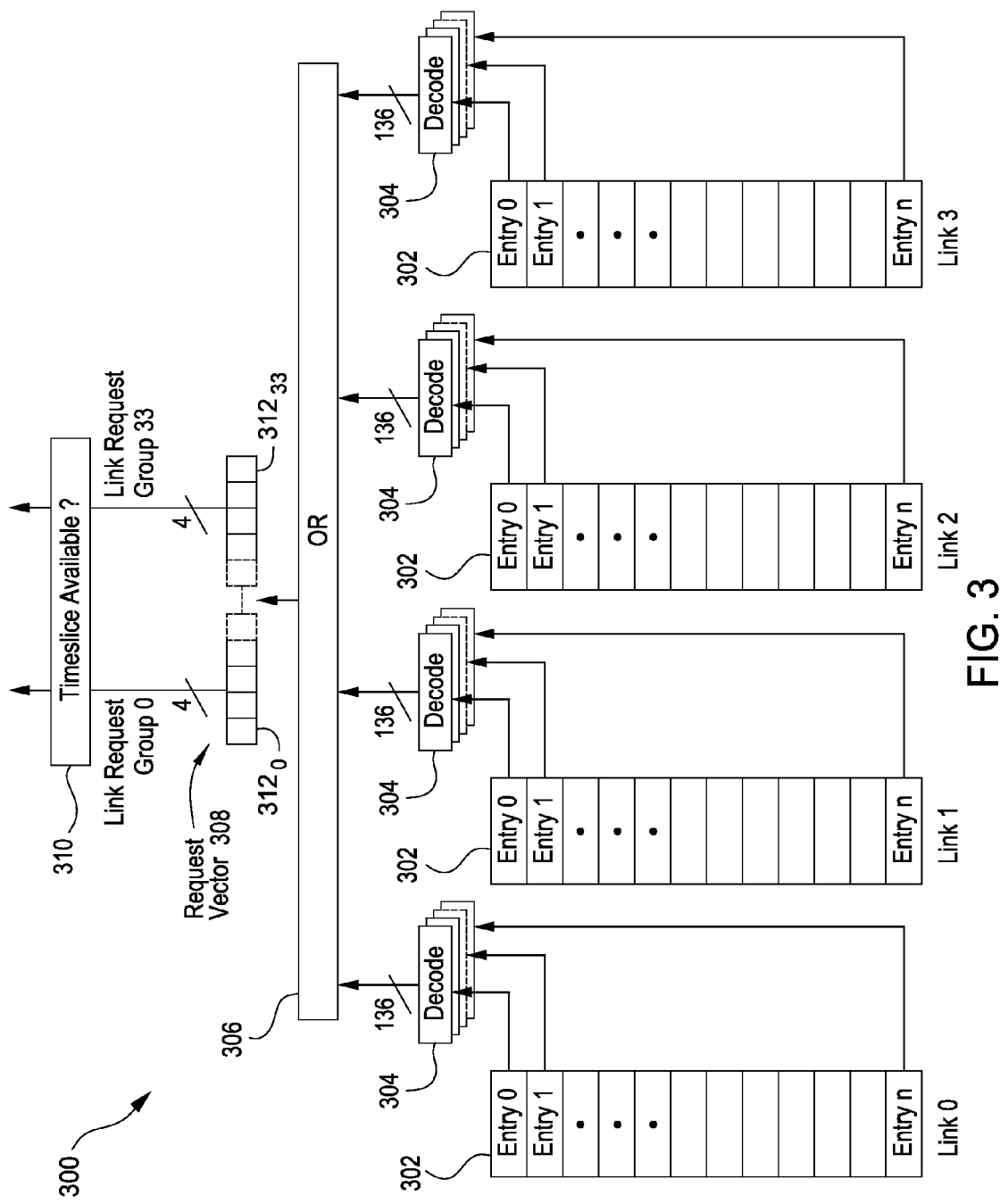
FIG. 3 is a block diagram depicting a technique for request formation performed by an input group arbiter as part of an arbitration operation for a corresponding quad, according to embodiments of the present disclosure.

FIG. 3 is a block diagram depicting a technique 300 for request formation performed by an input group arbiter 212 as part of an arbitration operation for a corresponding quad, according to embodiments of the present disclosure. Each input group arbiter 212 may manage requests for packet transfers from the corresponding group of (e.g., four) links through the use of a link queue 302. As shown in FIG. 3, the input group arbiter for a group may use a link queue 302 corresponding to each link in that group, identified as "link 0", "link 1", "link 2", "link 3." A link queue 302 includes a plurality of entries, entry 0 to entry n, corresponding to packets buffered in the accumulator 210. Each entry in the link queue 302 may specify a destination port of the corresponding buffered packet, and represents a request to transfer data through the data crossbar to that destination port.

In operation, decode blocks 304 performs a decode of the specified destination port for every valid entry (e.g., entry 0, entry 1, etc.) in the link queue 302 and generates a per-link request vector having a width equal to the number of possible destination ports. These requests are unified together, for example, by a logical OR block 306, and latched to meet timing, thereby forming a request vector 308, with each bit of the request vector corresponding to a particular output link of the switch unit 100. The request vector 308 may be broken into link request sub-vectors 312 associated with the output groups 112, where each bit in a sub-vector corresponds to a specific output subport in that output group. As such, the request vector 308 consolidates requests from the input subports. The input group arbiter 212 sends the sub-vectors to the respective output group arbiters 214 for grant processing, as described in greater detail in conjunction with FIG. 4.

In the implementation depicted in FIG. 3, each link queue 302 may contain 16 entries, corresponding to the accumulator's packet depth of 16, and has a choice of 136 possible destination ports. The decode performed on entries of the link queues 302 results in 4*(n+1) vectors having a width equal to the number of possible destination ports. The unifying operation (e.g., 306) generates a 136-bit request vector 308, which is broken into 34 (output quad) 4-bit sub-vectors (e.g., $312_0$ to $312_{33}$), and each bit in the 4-bit sub-vector corresponds to a specific output subport in that output quad.

In some embodiments, by execution of a logic block 310, each input arbiter may also track the timeslices, or cycle index, when that input's data buffer is transferring data to the data crossbar 108. When a timeslice is already busy, the request vector may be suppressed by a logic block 310 to avoid an output arbiter 214 from issuing a wasted grant, i.e., a grant that would not be accepted because the timeslice was busy.

According to one or more embodiments, each input arbiter 212 may be configured to not suppress a request vector for an input link for a timeslice, even if the input link has already accepted a grant for transferring a packet on a different timeslice. In other words, an input arbiter 212 may generate a request vector to transfer a packet queued for an input link that already is transferring a packet on a granted timeslice. For example, rather than suppress allow link0 from participating in a new request formation (e.g., decodes 304 and unifying operation 306) if link0 already had a packet transfer through the data crossbar in progress, the input arbiter 212 may include any destination ports in the link queue 302 associated with link0 in the request vector 308.

Figure 4:
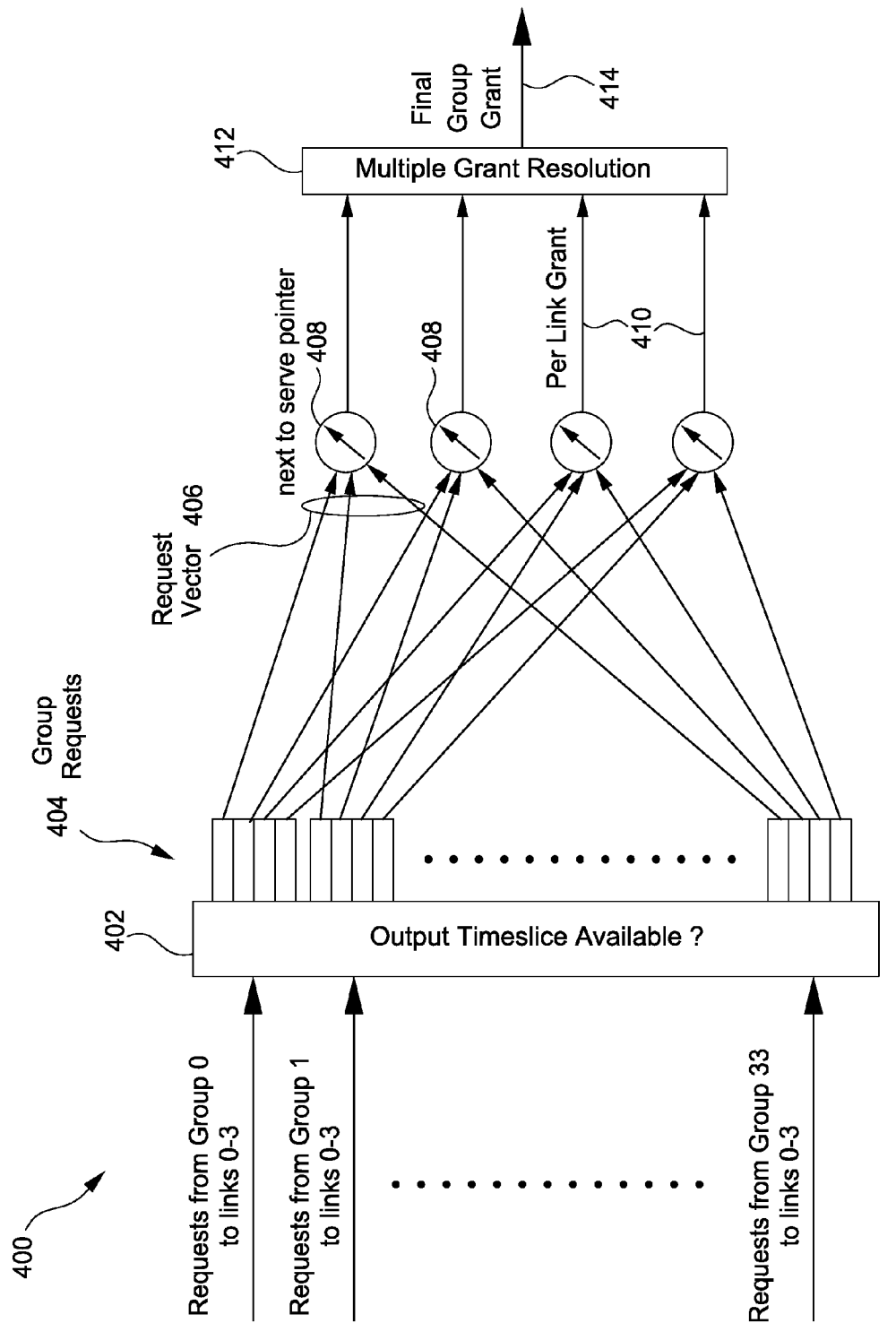
FIG. 4 is a block diagram depicting a technique for grant processing performed by an output group arbiter as part of an arbitration operation for a corresponding quad, according to embodiments of the present disclosure.

FIG. 4 is a block diagram depicting a technique 400 for grant processing performed by an output group arbiter 214 as part of an arbitration operation for a corresponding quad, according to embodiments of the present disclosure. As shown in FIG. 4, the output group arbiter may include a grant logic block 402, a plurality of next-to-serve pointers 408, and a grant resolution logic block 412. At the output group arbiter 214, the incoming sub-vectors 404 from all the input group arbiters 212 are re-organized and converted into a request vector 406 per output link.

For example, in one implementation, the output group arbiter 214 corresponding to the output group having output links 0-3, receives 4-bit sub-vectors from the input group arbiters 212 representing unified requests from groups of input links to transfer data to the output links 0-3. As shown, the output group arbiter receives a first 4-bit link request from Group 0 to links 0-3, a second 4-bit link request from Group 1 to links 0-3, and so forth, and a last 4-bit link request from Group 33 to links 0-3. These incoming 4-bit requests are converted into a 34-bit request vector per output link. In other words, all first bits, which are associated with output link 0, are taken from (all thirty-four) 4-bit requests to form a first 34-bit request vector associated with output link 0; all second bits, which are associated with the output link 1, are taken from the 4-bit request to form a second 34-bit request vector associated with output link 1, and so forth.

In one embodiment, the grant logic block 402 is configured to determine, for each output link, if the output link can grant an incoming request according to whether any of a plurality of conditions are met. In some embodiments, the conditions may include that: (1) an output subport cannot issue a grant if the output subport has no credits; (2) an output subport cannot issue a grant if the output subport is busy in any clock cycle in a supercycle; (3) an output subport cannot issue a grant if the associated output quad is busy in the corresponding transfer clock cycle; and (4) an output subport cannot issue a grant to a different input arbiter if the output subport issued a grant the previous cycle.

The plurality of next-to-serve pointers 408 are associated with the output subports, for example, one next-to-serve pointer 408 for each output subport. A next-to-serve pointer 408 associated with an output subport is configured to retrieve request for the (34-bit) output link request vector associated with that output subport. In operation, starting from the next-to-serve pointer 408, each output link may look at its incoming 34-bit request vector, choose a next request to serve, and issue a per-link grant 410 to some input link. If any of the (above-mentioned) conditions are met by an output link, the logic block 402 may instead suppress any grants 410 for that output link.

When multiple output links are able to issue a grant 410, the multiple grant resolution logic block 412 is configured to execute a resolution algorithm that determines which per-link grant 410 shall become a final group grant 414 issued. In some embodiments, the resolution algorithm may be a round-robin algorithm, or, in other embodiments, a pseudo-random sequence algorithm (e.g., linear feedback shift register (LFSR) algorithm) used to produce a sequence of bits that appear random, although any other suitable scheduling algorithm may be used. When a per-link grant 410 is the winner of the multiple grant resolution (e.g., at 412), the output group arbiter 214 may update the next-to-serve pointer 408 associated with the winning output link. In one implementation, the output group arbiter allows a configurable policy of advancing the next-to-serve pointer 408 when issuing a grant, or, in other cases, only advances the next-to-serve pointer 408 when the grant is accepted (by an input arbiter).

The output group arbiter 214 generates the final group grant 414 that designates a particular input quad has been issued a grant and that specifies which output subport in the output quad have issued the grant. The final group grant 414 may be combined with the final group grants generated by other output group arbiters acting in parallel, to form a final group grant vector. In one implementation, the output group arbiter 214 generates a 4-bit final grant 414 and sends the final group grant 414 to each input arbiter for accept processing, as described in greater detail in conjunction with FIG. 5.

Figure 5:
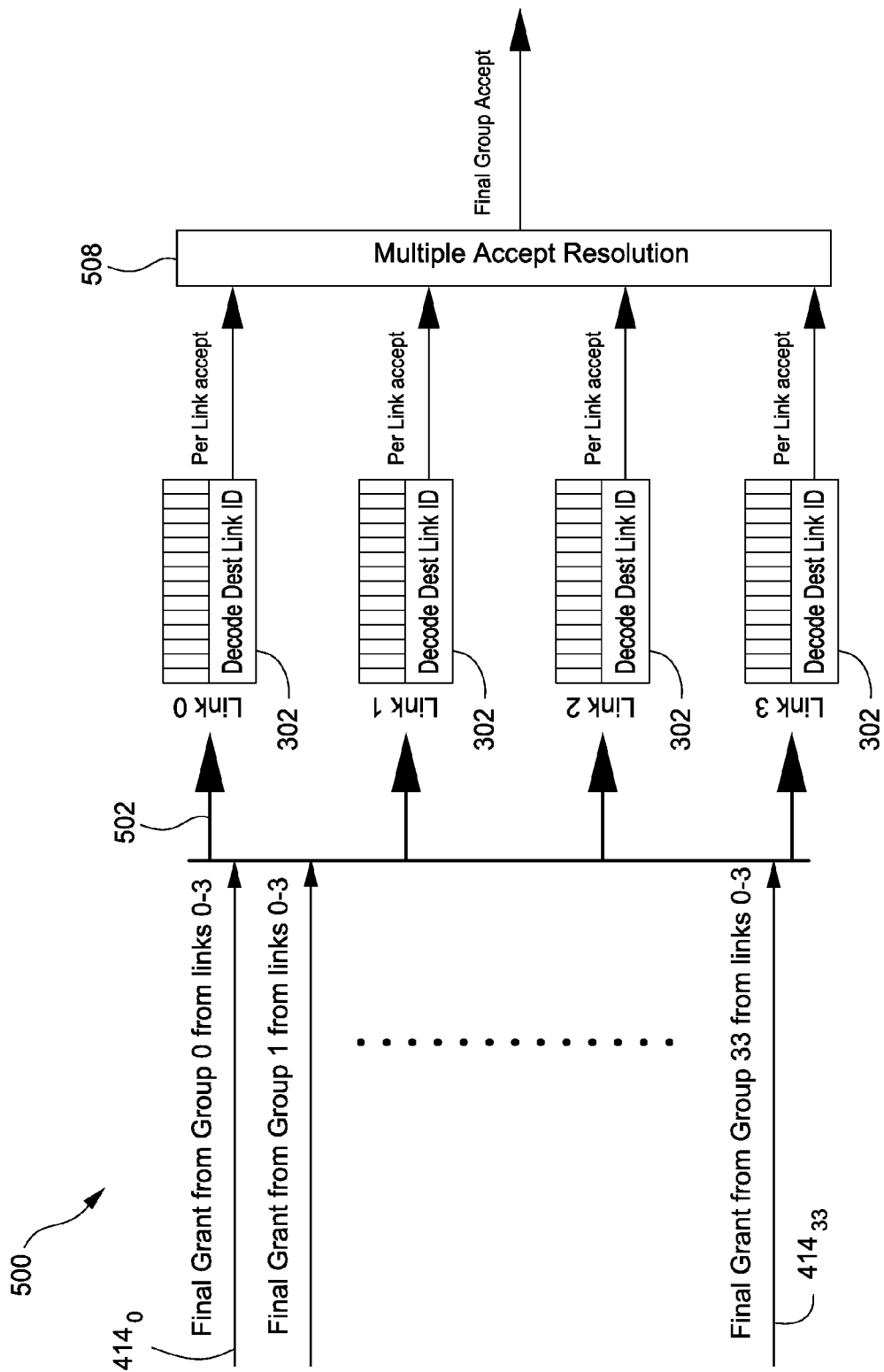
FIG. 5 is a block diagram depicting a technique for accept processing performed by an input group arbiter as part of an arbitration operation for a corresponding quad, according to embodiments of the present disclosure.

FIG. 5 is a block diagram depicting a technique 500 for accept processing performed by an input group arbiter 212 as part of an arbitration operation for a corresponding quad, according to embodiments of the present disclosure. As shown in FIG. 5, at each clock cycle, the input group arbiter receives a final group grant 414 (e.g., 4-bit final grant) from each output quad, which indicates which output quads (and for which specific output subport) have issued a grant to this input quad. In some embodiments, the input arbiter may receive 1 grant per output quad. For example, in one implementation, the input group arbiter 212 corresponding to an input quad, receives a 4-bit final grant from the output Group 0 from links 0-3, a second 4-bit final grant from Group 1 from links 0-3, and so forth, and a last 4-bit link request from Group 33 from links 0-3.

At 502, the input arbiter re-orders these final group grants 414 to match the original request vectors 308 formed during the request formation in FIG. 3. For example, the 34 4-bit final group grants 414 received from the output quads are reordered into one 136-bit grant vector, where each bit of the 136-bit grant vector maps corresponds to an output subport and indicates whether that output subport has issued a grant to this input quad.

As depicted in FIG. 5, the input arbiter performs a search, starting from the oldest entry in each link queue 302, to find the oldest entry that matches the incoming grant vector. If multiple link queues 302 are capable of accepting a grant, a multiple accept resolution logic block 508 of the input arbiter may execute a resolution algorithm that determines which per-link accept shall become the final group accept. Similar to the multiple grant resolution logic block described above, the multiple accept resolution logic block 508 may utilize a resolution algorithm, such as a round-robin algorithm or a LFSR algorithm, although any other suitable scheduling algorithm may be used. When a packet has been accepted, the input arbiter signals to various components within the switch unit 100 to begin the transfer, as described in further detail in conjunction with FIG. 6.

Figure 6:
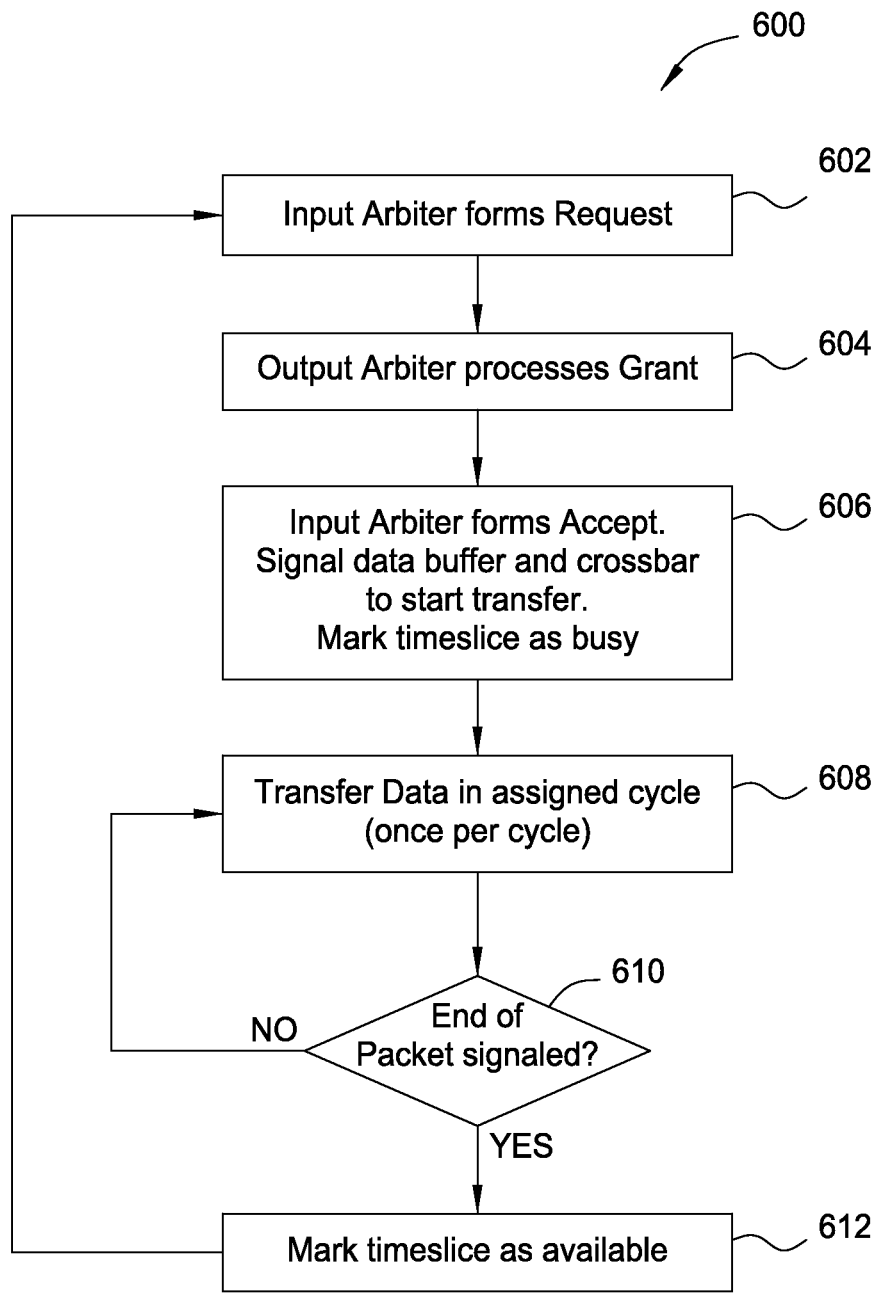
FIG. 6 is a flow diagram depicting a method for performing an arbitration process, marking a timeslice as busy, and clearing the busy status, according to one embodiment of the present disclosure.

FIG. 6 is a flow diagram depicting a method 600 for performing an arbitration process, marking a timeslice as busy, and clearing the busy status, according to one embodiment of the present disclosure. At step 602, an input group arbiter 212 for an input quad forms a request to transfer one of the buffered packets received by that input quad through the data crossbar 108 to a targeted output subport (as depicted in FIG. 3).

At step 604, an output group arbiter 214 associated with an output quad processes and issues a grant for one of the requests received from the plurality of input arbiters (as depicted in FIG. 4). The processed grant indicates which of the input quads has been granted access to transfer one of the output links of that output quad.

At step 606, the input group arbiter 212 forms an accept of the issued grant for one the input links in that input quad (as depicted in FIG. 5). In one example, the input group arbiter selects a first input port of the input group according to a first arbitration operation, wherein the input group comprises a plurality of input ports including the first input port having buffered data packets targeting a plurality of output ports. When a packet has been accepted, the input arbiter 212 signals to the matching data buffer block (e.g., accumulator 210) that is storing the accepted packet to start a transfer on a specified timeslice, or cycle index, within the supercycle. The input arbiter 212 then signals to the data crossbar 108 to route the accepted packet from the accumulator 210 of the accepted input link to the output data buffer 220 of the granted output subport during the specified timeslice.

In one embodiment, this timeslice may be marked as busy in both the input arbiters and output arbiters, which prevents any other arbiter from driving data from the input or to the output in that cycle. This input/output timeslice pair may remain busy until the input data buffer block (e.g., accumulator 210) signals that the transfer is complete. In some embodiments, the input arbiter does not store any length information, as length information may not be known if the packet is being transferred in a cut-through manner.

At step 608, the data crossbar 108 transfers the packet data during the assigned cycle index of the supercycles, once per supercycle, until the end of the packet is signaled, at step 610. At step 612, responsive to detecting the end of the packet has been transferred, the input and output arbiters 212, 214 mark the specified timeslice as available for other transfers. The method 600 may return to step 602 to perform a new request/grant/accept arbitration process for other packets received by the switch unit 100.

In one or more embodiments, the input arbiter may perform a second arbitration process that selects the same first input port for transferring another of the buffered packets. The input arbiter may generate a request for the input group that includes availability of the first input port, while the first input port is transferring the first packet during the first timeslice of the cycle (e.g., in step 608 above). In such an embodiment, while the data crossbar 108 is transferring packet data for the first packet, the data crossbar may then transfer data for a second packet from the same first input port during another (second) timeslice of the supercycle. In some cases, the first packet is transferred to a first output port of an output group, and the second packet is transferred to a second output port. In other cases, the first packet is transferred to a first output port of an output group, and the second packet is transferred to the same first output port.

Figure 7:
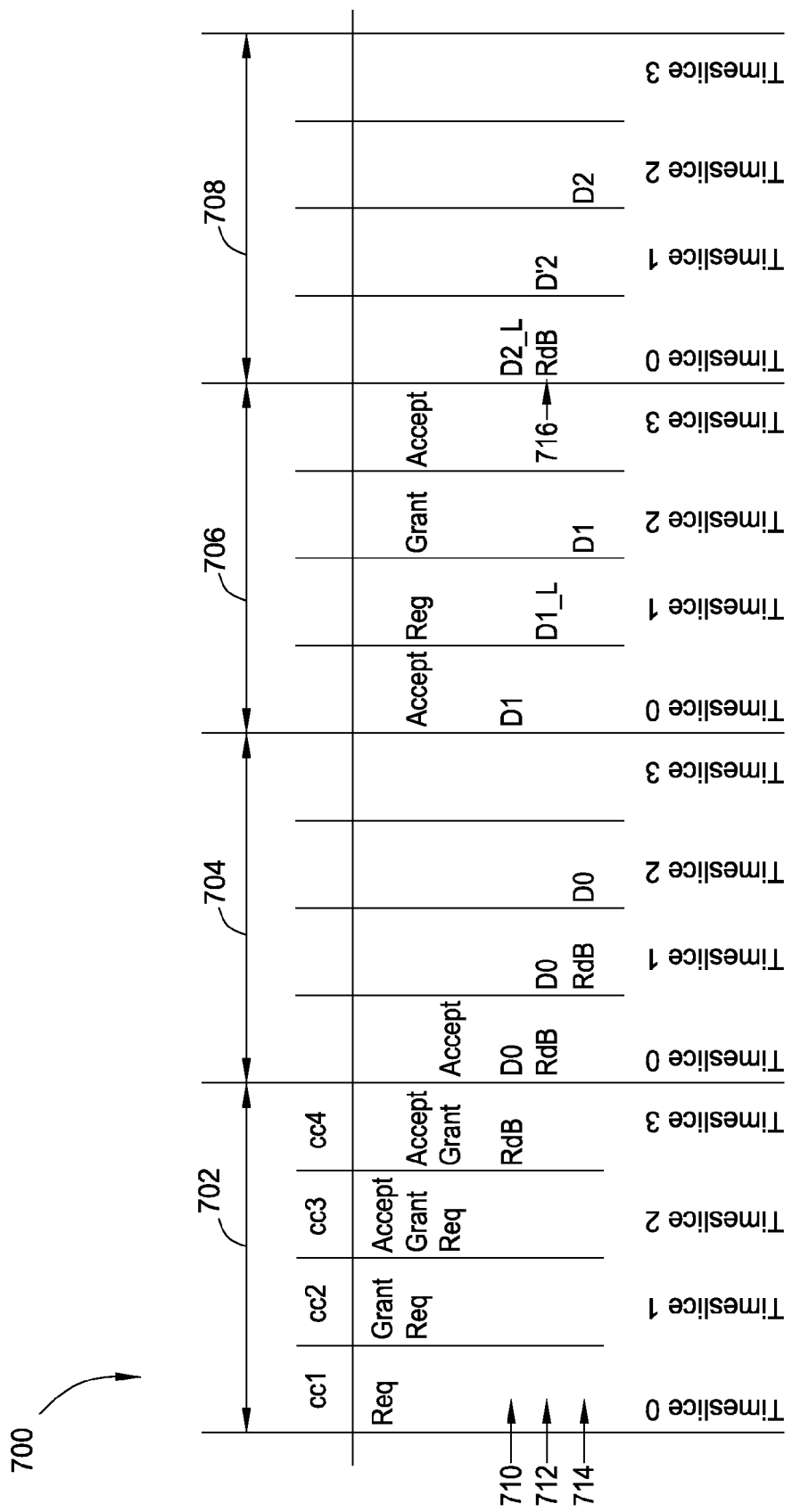
FIG. 7 is a block diagram illustrating a timing sequence for performing arbitration and transferring data within the data crossbar, according to one embodiment of the present disclosure.

FIG. 7 is a chart illustrating a timing sequence 700 of example dataflow and timeslice operations performed by the switch unit 100 during multiple supercycles, according to one embodiment of the present disclosure. The timing sequence 700 includes a plurality of supercycles 702, 704, 706, 708, each having clock cycles cc1, cc2, cc3, cc4, and is designated with a given timeslice, or cycle index (e.g., "timeslice 0", "timeslice 1", "timeslice 2", "timeslice 3").

As shown in FIG. 7, in a first clock cycle cc1 of the first supercycle 702, a request to transfer a first packet from a first input quad was made, and at the second clock cycle cc2 of the first supercycle 702, a grant is returned. At the third clock cycle cc3 of the supercycle 702, the input quad accepts that grant; at the four clock cycle cc4 of the supercycle 702, the packet data is read from the input buffer and prepared to be transferred through the crossbar (i.e., "RdB"). While the request-grant-accept arbitration process is depicted in FIG. 7 as occurring in consecutive clock cycles, it should be noted that in some cases, each of the request formation, grant processing, and accepting processing operations may be performed across multiple clock cycles, and with having arbitrary amounts of time between the operations.

As discussed above, when a packet wins arbitration, transfer of that packet will occupy an allocated timeslice within supercycles for the duration of that packet transfer. As such, the transfer of a first packet 710 from one of the input links in the input quad is performed during the designated timeslice 0. A first portion D0 of the packet is transferred through the data crossbar 108 during the timeslice 0 of the second supercycle 704; a second portion D1 of the packet is transferred during the timeslice 0 of the third supercycle 706; and a last portion D2_L of the packet is transferred during the timeslice 0 of the fourth supercycle 708.

As further shown in FIG. 7, another arbitration process may be performed to determine a second packet 712 to be transferred through the data crossbar 108 during the other timeslices 1-3 that may be idle. For example, a request, grant, and accept may be processed during cc2-cc4 of the first supercycle 702 to schedule a second packet to be transferred through the crossbar during timeslice 1 of the subsequent supercycles, as depicted by "D0", "D1_L" during timeslice 1 of supercycles 704, 706 respectively. In another example, a request, grant, and accept may be processed during cc3-cc4 of the first supercycle 702 and cc1 of the second supercycle 704 to schedule a third packet 714 to be transferred through the crossbar during the timeslice 2 of the subsequent supercycles, i.e., "D0", "D1", and "D3" during timeslice 2 of supercycles 704, 706, 708, respectively. It is noted that the supercycles allow for the simultaneous transfer of multiple packets during different clock cycles of a supercycle, for example, portions of three different packets are transmitted during timeslice 0-2 in the second supercycle 704 (note: timeslice 3 is idle). It is further noted that as packet transfers are completed, the timeslices are made available for other transfers. In one example, timeslice 1 becomes available again when the second packet transferred during timeslice 1 has completed its transfer in cc2 of the third supercycle 706. Another arbitration process (i.e., request-grant-accept) is performed to schedule a fourth packet 716 during the available timeslice 1 of the subsequent supercycle 708, i.e., "D'2".

Embodiments of the present disclosure allows for any combination of input links to occupy clock cycles within the supercycle. The clock cycles may be distributed across all (four) input links of an input quad, e.g., links 0, 1, 2, 3 occupy clock cycles cc1, cc2, cc3, cc4, or, one input link may occupy multiple clock cycles, e.g., link 0 may occupy clock cycles cc1, cc2, cc3, cc4. For example, the first packet 710 (transferred during timeslice 0 of supercycles 704, 706, 708) may be from a first input link of the input quad, and the second packet 712 (transferred during timeslice 1 of supercycles 704, 706) may be from the same input link of the input quad. The arbitration structure described herein, of assigning a crossbar timeslice only after successful arbitration, with no affinity between input link number and subcycle, allows any input link to claim any clock cycle or timeslice. The assigned clock cycle may be different from packet to packet. Because there is no link-to-cycle affinity, if a given link has enough packets buffered, a link transfer may occupy more than one clock cycle within the supercycle. This scheduling scheme increases bandwidth efficiency, and allows requests from additional buffered packets from a same input link to be granted rather than a newer request from a different input link. As such, if an input buffer for a particular input link gets backed up with numerous waiting packets, embodiments of the present disclosure provide a mechanism to drain numerous buffered packets from the same input link.

Example Distributed Network Switch

Figure 8:
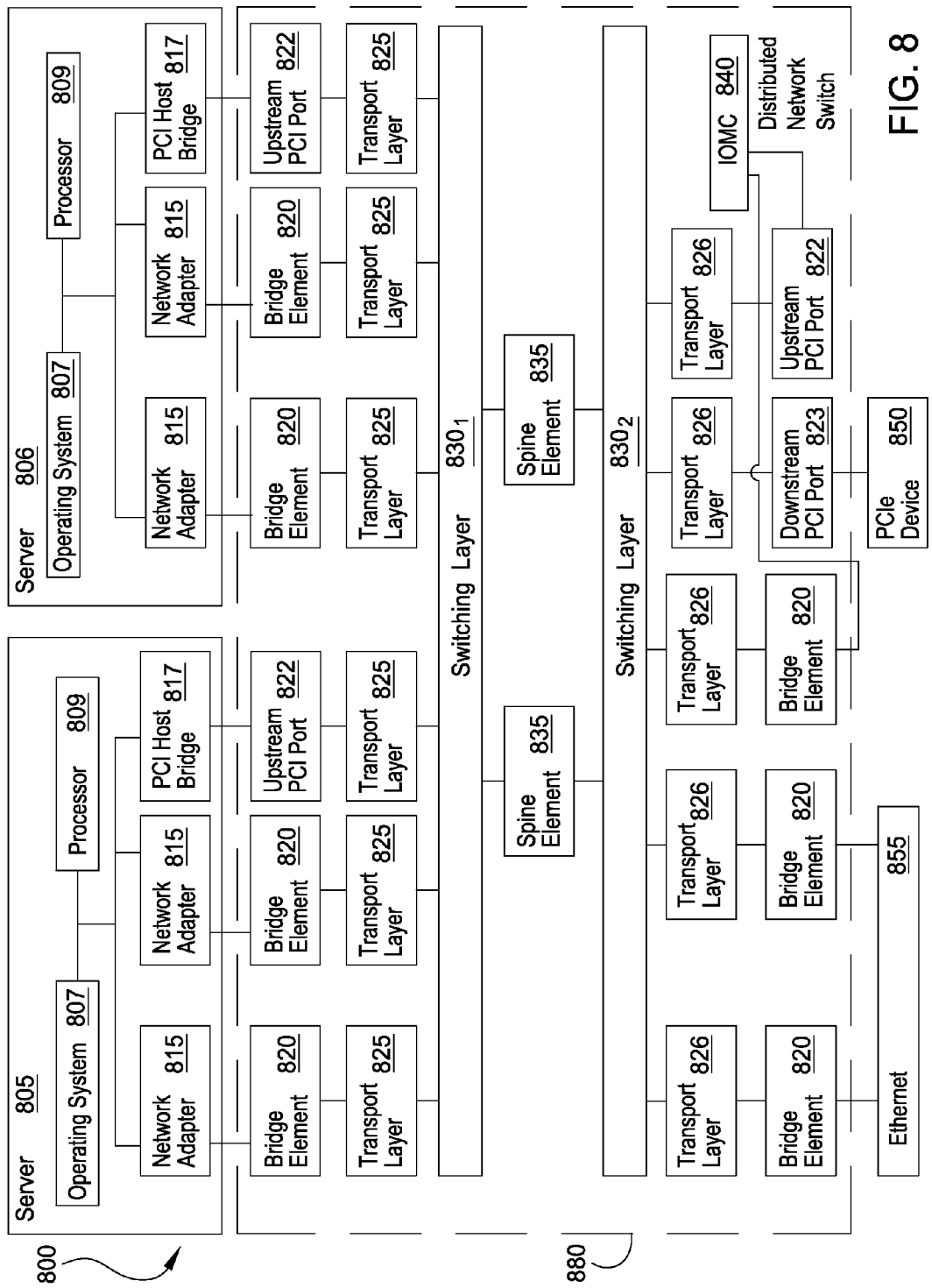
FIG. 8 illustrates a system architecture that includes a distributed virtual switch, according to one embodiment described herein.

FIG. 8 illustrates a system architecture 800 that includes a distributed network switch 880, according to one embodiment described herein. The first server 805 may include at least one processor 809 coupled to a memory (not pictured). The processor 809 may represent one or more processors (e.g., microprocessors) or multi-core processors. The memory may represent random access memory (RAM) devices comprising the main storage of the server 805, as well as supplemental levels of memory, e.g., cache memories, non-volatile or backup memories (e.g., programmable or flash memories), read-only memories, and the like. In addition, the memory may be considered to include memory storage physically located in the server 805 or on another computing device coupled to the server 805.

The server 805 may operate under the control of an operating system 807 and may execute various computer software applications, components, programs, objects, modules, and data structures, such as virtual machines (not pictured).

The server 805 may include network adapters 815 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 800 may include a multi-root I/O virtualization (MR-IOV) adapter. The network adapters 815 may further be used to implement of Fiber Channel over Ethernet (FCoE) protocol, RDMA over Ethernet, Internet small computer system interface (iSCSI), and the like. In general, a network adapter 815 transfers data using an Ethernet or PCI based communication method and may be coupled to one or more of the virtual machines. Additionally, the adapters may facilitate shared access between the virtual machines. While the adapters 815 are shown as being included within the server 805, in other embodiments, the adapters may be physically distinct devices that are separate from the server 805.

In one embodiment, each network adapter 815 may include a converged adapter virtual bridge (not shown) that facilitates data transfer between the adapters 815 by coordinating access to the virtual machines (not pictured). Each converged adapter virtual bridge may recognize data flowing within its domain (i.e., addressable space). A recognized domain address may be routed directly without transmitting the data outside of the domain of the particular converged adapter virtual bridge.

Each network adapter 815 may include one or more Ethernet ports that couple to one of the bridge elements 820. Additionally, to facilitate PCIe communication, the server may have a PCI Host Bridge 817. The PCI Host Bridge 817 would then connect to an upstream PCI port 822 on a switch element in the distributed switch 880. The data is then routed via a first switching layer $830_1$ to one or more spine elements 835. The spine elements 835 contain the hierarchical crossbar schedulers (not pictured), which perform the arbitration operations described above. The data is then routed from the spine elements 835 via the second switching layer $830_2$ to the correct downstream PCI port 823 which may be located on the same or different switch module as the upstream PCI port 822. The data may then be forwarded to the PCI device 850. While the switching layers $830_{1-2}$ are depicted as separate, they logically represent different passes through the same switching layer 830, before and after being routed through one of the spine elements 835.

The bridge elements 820 may be configured to forward data frames throughout the distributed network switch 880. For example, a network adapter 815 and bridge element 820 may be connected using two 40 Gbit Ethernet connections or one 100 Gbit Ethernet connection. The bridge elements 820 forward the data frames received by the network adapter 815 to the first switching layer $830_1$, which is then routed through a spine element 835, and through the second switching layer $830_2$. The bridge elements 820 may include a lookup table that stores address data used to forward the received data frames. For example, the bridge elements 820 may compare address data associated with a received data frame to the address data stored within the lookup table. Thus, the network adapters 815 do not need to know the network topology of the distributed switch 880.

The distributed network switch 880, in general, includes a plurality of bridge elements 820 that may be located on a plurality of a separate, though interconnected, hardware components. To the perspective of the network adapters 815, the switch 880 acts like one single switch even though the switch 880 may be composed of multiple switches that are physically located on different components. Distributing the switch 880 provides redundancy in case of failure.

Each of the bridge elements 820 may be connected to one or more transport layer modules 825 that translate received data frames to the protocol used by the switching layers $830_{1-2}$. For example, the transport layer modules 825 may translate data received using either an Ethernet or PCI communication method to a generic data type (i.e., a cell) that is transmitted via the switching layers $830_{1-2}$ (i.e., a cell fabric). Thus, the switch modules comprising the switch 880 are compatible with at least two different communication protocols—e.g., the Ethernet and PCIe communication standards. That is, at least one switch module has the necessary logic to transfer different types of data on the same switching layers $830_{1-2}$.

Although not shown in FIG. 8, in one embodiment, the switching layers $830_{1-2}$ may comprise a local rack interconnect with dedicated connections which connect bridge elements 820 located within the same chassis and rack, as well as links for connecting to bridge elements 820 in other chassis and racks.

After the spine element 835 routes the cells, the switching layer $830_2$ may communicate with transport layer modules 826 that translate the cells back to data frames that correspond to their respective communication protocols. A portion of the bridge elements 820 may facilitate communication with an Ethernet network 855 which provides access to a LAN or WAN (e.g., the Internet). Moreover, PCI data may be routed to a downstream PCI port 823 that connects to a PCIe device 850. The PCIe device 850 may be a passive backplane interconnect, as an expansion card interface for add-in boards, or common storage that can be accessed by any of the servers connected to the switch 880.

Although "upstream" and "downstream" are used to describe the PCI ports, this is only used to illustrate one possible data flow. For example, the downstream PCI port 823 may in one embodiment transmit data from the connected to the PCIe device 850 to the upstream PCI port 822. Thus, the PCI ports 822, 823 may both transmit as well as receive data.

A second server 806 may include a processor 809 connected to an operating system 807 and memory (not pictured) which includes one or more virtual machines similar to those found in the first server 805. The memory of server 806 also includes a hypervisor (not pictured) with a virtual bridge (not pictured). The hypervisor manages data shared between different virtual machines. Specifically, the virtual bridge allows direct communication between connected virtual machines rather than requiring the virtual machines to use the bridge elements 820 or switching layers $830_{1-2}$ to transmit data to other virtual machines communicatively coupled to the hypervisor.

An Input/Output Management Controller (IOMC) 840 (i.e., a special-purpose processor) is coupled to at least one bridge element 820 or upstream PCI port 822 which provides the IOMC 840 with access to the second switching layer $830_2$. One function of the IOMC 840 may be to receive commands from an administrator to configure the different hardware elements of the distributed network switch 880. In one embodiment, these commands may be received from a separate switching network from the second switching layer $830_2$.

Although one IOMC 840 is shown, the system 800 may include a plurality of IOMCs 840. In one embodiment, these IOMCs 840 may be arranged in a hierarchy such that one IOMC 840 is chosen as a master while the others are delegated as members (or slaves).

Figure 9:
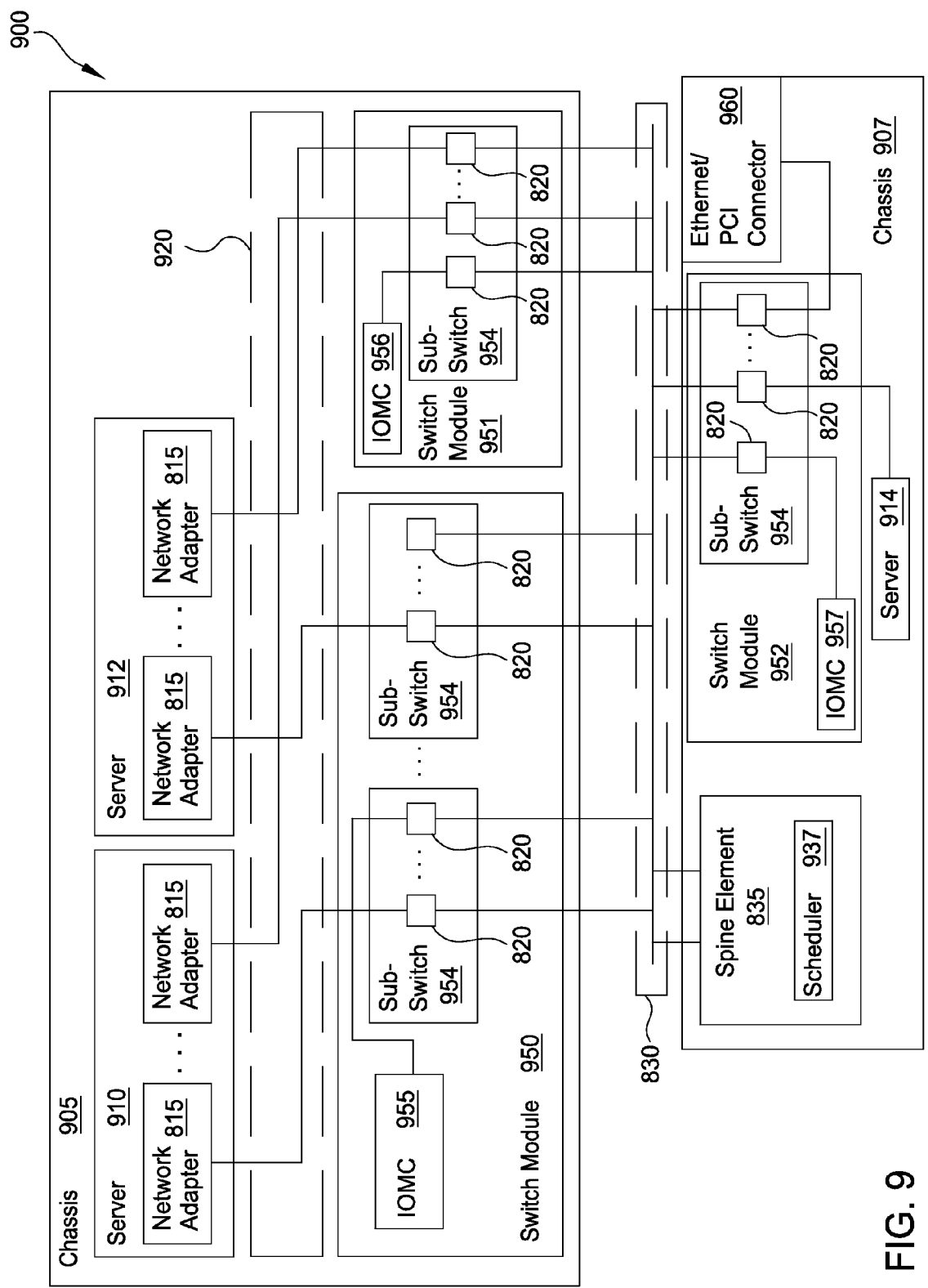
FIG. 9 illustrates a hardware representation of a system that implements a distributed network switch, according to one embodiment of the present disclosure.

FIG. 9 illustrates a hardware level diagram 900 of the system 800, according to one embodiment described herein. Server 910 and 912 may be physically located in the same chassis 905; however, the chassis 905 may include any number of servers. The chassis 905 also includes a plurality of switch modules 950, 951 that include one or more sub-switches 954 (i.e., a microchip). In one embodiment, the switch modules 950, 951, 952 are hardware components (e.g., PCB boards, FPGA boards, etc.) that provide physical support and connectivity between the network adapters 815 and the bridge elements 820. In general, the switch modules 950, 951, 952 include hardware that connects different chassis 905, 907 and servers 910, 912, 914 in the system 900 and may be a single, replaceable part in the computing system.

The switch modules 950, 951, 952 (e.g., a chassis interconnect element) include one or more sub-switches 954 and an IOMC 955, 956, 957. The sub-switches 954 may include a logical or physical grouping of bridge elements 820—e.g., each sub-switch 954 may have five bridge elements 820. Each bridge element 820 may be physically connected to the servers 910, 912. For example, a bridge element 820 may route data sent using either Ethernet or PCI communication protocols to other bridge elements 820 attached to the switching layer 830 using the routing layer. However, in one embodiment, the bridge element 820 may not be needed to provide connectivity from the network adapter 815 to the switching layer 830 for PCI or PCIe communications.

The spine element 835 allows for enhanced switching capabilities by connecting N number of sub-switches 954 using less than N connections, as described above. To facilitate the flow of traffic between the N switch elements, the spine element 835 has a hierarchical crossbar scheduler 937 which perform the arbitration operations described above. The inputs ports coming from different sub-switches 954 are grouped into input quads or groups on the spine element 835. The input groups communicate to the crossbar scheduler 937 when one or more of their input ports have packets targeting an output port of the spine element 835, which are also grouped into quads. As described above, the crossbar scheduler 937 provides efficient use of the crossbar bandwidth by allowing any of the input ports to send packets to multiple output ports using different subcycles of a supercycle.

Each switch module 950, 951, 952 includes an IOMC 955, 956, 957 for managing and configuring the different hardware resources in the system 900. In one embodiment, the respective IOMC for each switch module 950, 951, 952 may be responsible for configuring the hardware resources on the particular switch module. However, because the switch modules are interconnected using the switching layer 830, an IOMC on one switch module may manage hardware resources on a different switch module. As discussed above, the IOMCs 955, 956, 957 are attached to at least one sub-switch 954 (or bridge element 820) in each switch module 950, 951, 952 which enables each IOMC to route commands on the switching layer 830. For clarity, these connections for IOMCs 956 and 957 have been omitted. Moreover, switch modules 951, 952 may include multiple sub-switches 954.

The dotted line in chassis 905 defines the midplane 920 between the servers 910, 912 and the switch modules 950, 951. That is, the midplane 920 includes the data paths (e.g., conductive wires or traces) that transmit data between the network adapters 815 and the sub-switches 954.

Each bridge element 820 connects to the switching layer 830 via the routing layer. In addition, a bridge element 820 may also connect to a network adapter 815 or an uplink. As used herein, an uplink port of a bridge element 820 provides a service that expands the connectivity or capabilities of the system 900. As shown in chassis 907, one bridge element 820 includes a connection to an Ethernet or PCI connector 960. For Ethernet communication, the connector 960 may provide the system 900 with access to a LAN or WAN (e.g., the Internet). Alternatively, the port connector 960 may connect the system to a PCIe expansion slot—e.g., PCIe device 850. The device 850 may be additional storage or memory which each server 910, 912, 914 may access via the switching layer 830. Advantageously, the system 900 provides access to a switching layer 830 that has network devices that are compatible with at least two different communication methods.

As shown, a server 910, 912, 914 may have a plurality of network adapters 815. This provides redundancy if one of these adapters 815 fails. Additionally, each adapter 815 may be attached via the midplane 920 to a different switch module 950, 951, 952. As illustrated, one adapter of server 910 is communicatively coupled to a bridge element 820 located in switch module 950 while the other adapter is connected to a bridge element 820 in switch module 951. If one of the switch modules 950, 951 fails, the server 910 is still able to access the switching layer 830 via the other switching module. The failed switch module may then be replaced (e.g., hot-swapped) which causes the IOMCs 955, 956, 957 and bridge elements 820 to update the routing tables and lookup tables to include the hardware elements on the new switching module.

Figure 10:
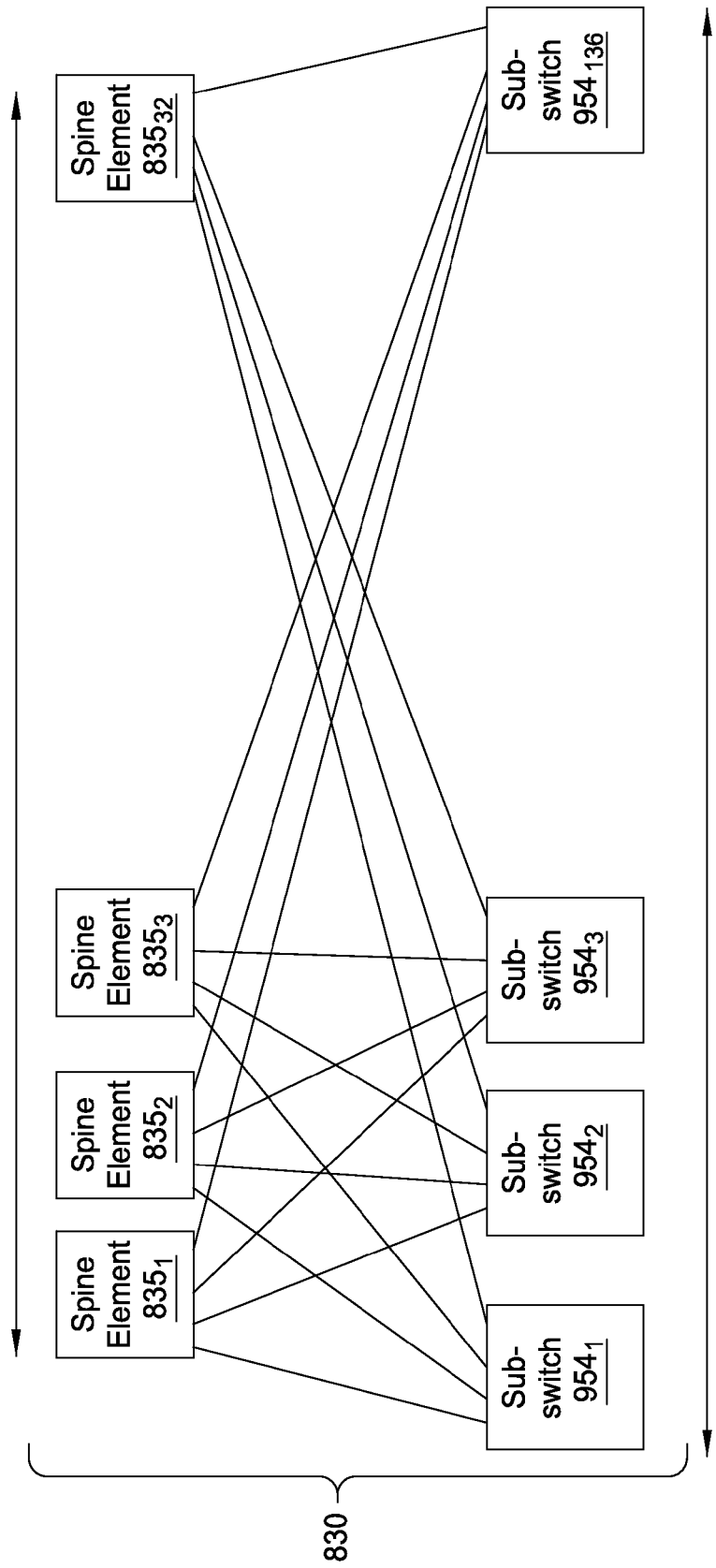
FIG. 10 illustrates one embodiment of the virtual switching layer shown in FIG. 8.

FIG. 10 illustrates the virtual switching layer 830, according to one embodiment described herein. As shown, the switching layer 830 may use a spine-leaf architecture where each sub-switch $954_{1-136}$ (i.e., a leaf node) is attached to at least one spine node $935_{1-32}$. The spine nodes $835_{1-32}$ route cells received from the sub-switch $954_N$ to the correct spine node which then forwards the data to the correct sub-switch $954_{N'}$. That is, no matter the sub-switch $954_N$ used, a cell (i.e., data packet) can be routed to another other sub-switch $954_{N'}$ located on any other switch module $954_{1-N'}$. Although 136 sub-switches and 32 spine elements are illustrated in FIG. 10, embodiments disclosed herein are not limited to such a configuration, as broader ranges are contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A computer program product for scheduling a crossbar using distributed request-grant-accept arbitration between input group arbiters and output group arbiters in a switch unit, the computer program product comprising:
   a non-transitory computer-readable storage medium having computer-readable program code embodied therewith, the computer-readable program code comprising:
      computer-readable program code configured to select a first input port of an input group according to a first arbitration operation, wherein the input group comprises a plurality of input ports including the first input port having buffered packets targeting a plurality of output ports;
      computer-readable program code configured to, transfer, by operation of a crossbar, a first packet of the buffered packets from the first input port during a first timeslice of a cycle, wherein the cycle comprises a plurality of timeslices;
      computer-readable program code configured to select the first input port according to a second arbitration operation, further comprising computer-readable program code configured to generate a request for the input group that includes availability of the first input port, while the first input port is transferring the first packet during the first timeslice of the cycle; and
      computer-readable program code configured to, transfer, by operation of the crossbar, a second packet of the buffered packets from the same first input port during a second timeslice of the cycle.

2. The computer program product of claim 1, wherein the first arbitration operation comprises a request-grant-accept arbitration between an input arbiter associated with the input group and an output arbiter associated with the plurality of output ports.

3. The computer program product of claim 1, wherein the crossbar has a data width that is greater than an incoming data rate of the first input port.

4. The computer program product of claim 1, wherein the number of timeslices in a cycle is determined based on a ratio of a data width of the crossbar to an incoming data rate of the first input port.

5. The computer program product of claim 1, wherein the first packet is transferred to a first output port of an output group, and the second packet is transferred to a second output port.

6. The computer program product of claim 1, wherein the first packet is transferred to a first output port of an output group, and the second packet is transferred to the same first output port.

7. An apparatus comprising:
   a plurality of input ports including a first input port organized into input groups;
   a plurality of output ports organized into output groups;
   a crossbar configured to selectively connect the plurality of input ports to the plurality of output ports;
   a computer processor; and
   a memory storing firmware, which, when executed on the computer processor, performs an operation comprising:
      selecting the first input port of an input group according to a first arbitration operation, the first input port having buffered packets targeting at least one of the plurality of output ports;
      transferring, by operation of the crossbar, a first packet of the buffered packets from the first input port during a first timeslice of a cycle, wherein the cycle comprises a plurality of timeslices;
      selecting the first input port according to a second arbitration operation, wherein selecting the first input port comprises generating a request for the input group that includes availability of the first input port, while the first input port is transferring the first packet during the first timeslice of the cycle; and
      transferring, by operation of the crossbar, a second packet of the buffered packets from the same first input port during a second timeslice of the cycle.

8. The apparatus of claim 7, wherein the first arbitration operation comprises a request-grant-accept arbitration between an input arbiter associated with the input group and an output arbiter associated with the plurality of output ports.

9. The apparatus of claim 7, wherein the crossbar has a data width that is greater than an incoming data rate of the first input port.

10. The apparatus of claim 7, wherein the number of timeslices in a cycle is determined based on a ratio of a data width of the crossbar to an incoming data rate of the first input port.

11. The apparatus of claim 7, wherein the first packet is transferred to a first output port of an output group, and the second packet is transferred to a second output port.

12. The apparatus of claim 7, wherein the first packet is transferred to a first output port of an output group, and the second packet is transferred to the same first output port.

* * * * *